May 3, 1927.
F. W. A. HENRICI
REVERSING MECHANISM
Filed March 23, 1923
1,627,434
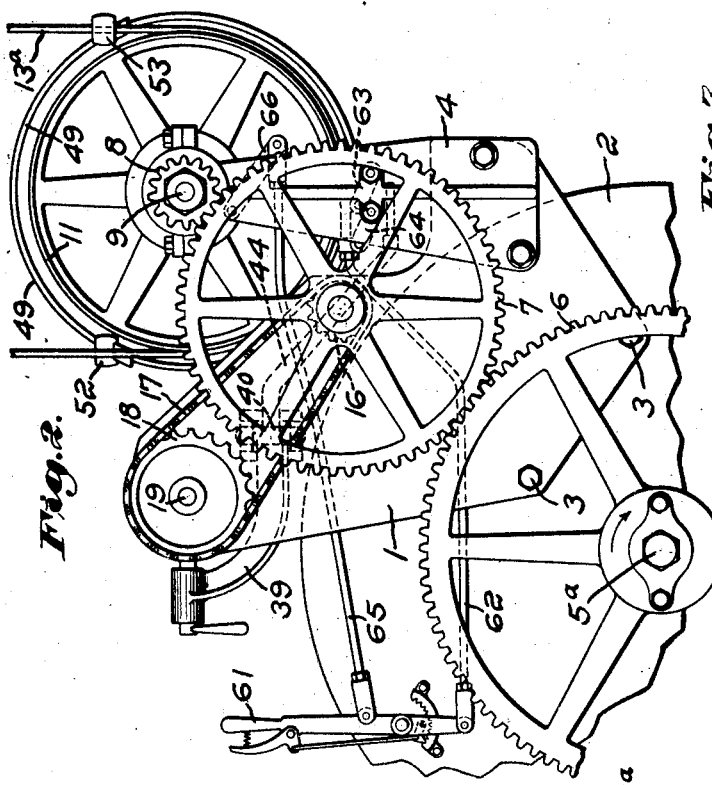
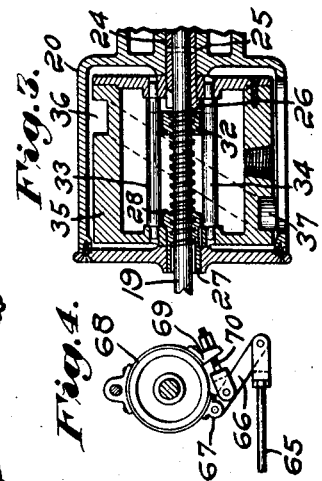
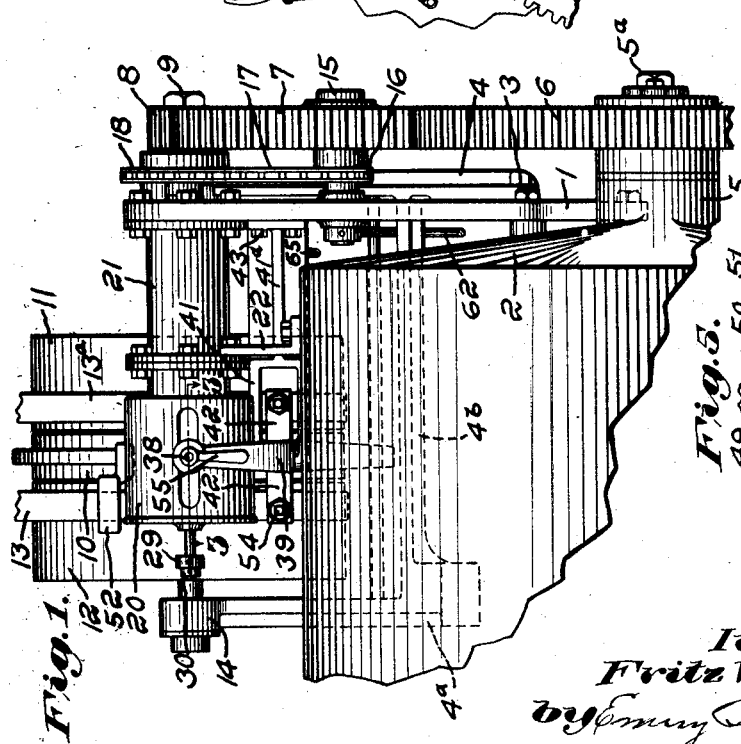
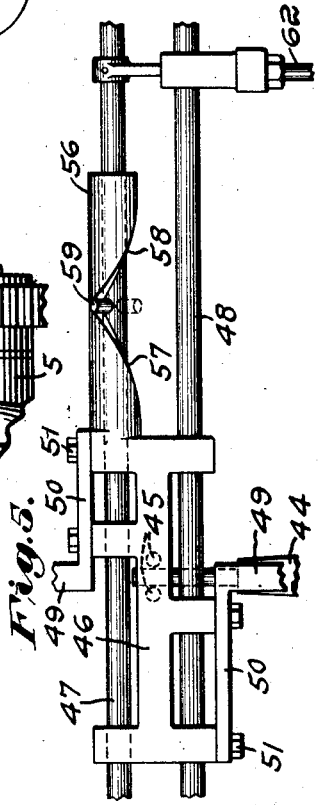
Inventor:
Fritz W. A. Henrici,
by Emery Booth Janney Varney
Attys.

Patented May 3, 1927.

1,627,434

UNITED STATES PATENT OFFICE.

FRITZ W. A. HENRICI, OF BOSTON, MASSACHUSETTS.

REVERSING MECHANISM.

Application filed March 23, 1923. Serial No. 627,158.

This invention relates to reversing mechanism and aims to provide an improved construction for that purpose adapted for general use where periodical reversal of motion is desired, and particularly for belt driven machines where compactness of construction and greatest efficiency is necessary.

In the drawings of one embodiment of my invention selected for illustration and description, Fig. 1 is a front elevation of my novel construction as applied to a laundry washing machine, the casing being broken away for convenience;

Fig. 2, an end view of the same, the casing also broken away;

Fig. 3, a horizontal section through the reversing cam case on the line 3—3, Fig. 1;

Fig. 4, a detail of the brake mechanism; and

Fig. 5, a detail of a portion of the belt shipping mechanism.

My improved construction, as illustrated, comprises, Figs. 1, 2, a bracket 1, adapted to be secured to the end, in this case, of a casing 2, of a washing machine, as by bolts 3. To this bracket, Figs. 1, 2, is also secured in similar manner a frame 4, the opposite or inner end 4$^a$ of which, see dotted lines Fig. 1, connected to the front end by a rib 4$^b$ rests upon and is secured to the casing, the use of which bracket will be presently described.

The casing is provided, Fig. 1, with bearings 5, only one being shown, and in one of which is mounted the driven axle 5$^a$, carrying a gear wheel 6, in mesh with a smaller gear 7 journaled in the bracket 1, this gear, in turn, being driven by a pinion 8 on the main driving shaft 9, actuated in turn, Figs. 1, 2, by the pulley 10, on each side of which is an idler 11, 12. The shaft 9 may be driven by any convenient means as the pulley 10 and from any convenient source, not shown, as by belts 13, 13$^a$ running in opposite directions. The opposite end of the driving shaft is journaled in the post 14 on the bracket 4$^a$.

It will be noticed that by the construction described, I have provided a novel arrangement of the driving members. The pulleys are above the cylinder, where there is the least possible danger from them, so that they need not be enclosed for protection of employees, valuable floor space is saved at the end of the cylinder, and the gears are brought close to the cylinder also saving valuable space. Furthermore, by this arrangement free access is had to the gears for removal or other attention without removing any other parts of the driving mechanism.

For affecting the periodic reversal of the driving mechanism I have provided the following means. On the stud 15, on the plate 1, Fig. 1, on which is mounted the gear 7, is a sprocket wheel 16 connected by a chain 17 with a second wheel 18 on a reversing shaft 19, see Figs. 2, 3, mounted in a cylindrical housing or timer case 20, one end of which is secured in turn to a hollow bracket 21, the adjacent end of the bracket being supported by the bracket or angle iron 22 on the cylinder 2, while the opposite end of the bracket 21 is secured to the bracket 1 already described, and through which the shaft 19 extends to receive the sprocket 18 referred to.

The reversing shaft 19, Fig. 3, carries a bushing 24 fastened thereto as by a pin 25, the bushing having a timer stop, as a finger or dog 26 extended longitudinally and laterally therefrom at its inner end, the purpose of which will be presently described. On its opposite end and threaded thereto the shaft 19 also carries a second bushing or timer regulator 27 provided at one end with a finger or stop 28 whose function is to determine the number of revolutions to be made by the shaft 19 and the driven member or drum before reversal takes place. This timer regulator 27 has, Fig. 1, on its outer end, a collar 29 by means of which the position of the regulator on the shaft 19, and consequently the number of revolutions of the latter and the driven member may be readily controlled as will presently appear.

The shaft 19, Fig. 1, also carries at its outer end a collar 30 fixed thereto, by means of which manual adjustment of the shaft may be readily made if desired.

The reversing shaft 19, Fig. 3, is threaded along its central portion to receive a traveling timing member 32 in the form of a nut which is restrained against rotative motion by two cam turning bars 33, 34, extended longitudinally within the hollow cylindrical cam 35, the nut 32 being channelled at opposite points on its circumference to receive said bars. For convenience in this case the timer 32 is shown at the extreme limit of travel to the right.

The outer face of the cam 35, Fig. 3, has a circumferential path or groove 36 therein in which travels a roll 37 on the inner end of a stud 38, Fig. 1, on the upper end of a curved arm 39, pivoted by a pin 40, Fig. 2, between the two forks of an arm 41, Fig. 1, on a bracket 41ª extended laterally from the plate 1 by nuts 43.

Extended laterally from the foot of the arm 39, Fig. 1, are two arms 42 opposite which are similar arms, not shown, on the upper end of an arm 44, Fig. 2, also pivoted in the pin 40 and extended downwardly and rearwardly of the casing 2, the rear end of the arm being operatively connected with the driving mechanism, as positioned between two pins 45, see dotted lines, Fig. 5, depending from a belt shipper 46 which slides longitudinally on the rods 47, 48.

This shipper is provided with a curvilinear member or hoop 49, Figs. 2 and 5, its laterally bent ends 50 being secured to the member 46, by nuts 51, the member 49 carrying two eyes 52, 53 through which respectively run the belts 13, 13ª. The two arms 42 are secured to the two corresponding arms on the end of arm 44 by bolts 54, about which are coiled springs, not shown, and which act as yielding spacers between the arms 39, 44, so that in case for any reason either arm is obstructed in its free movement the yielding of the springs will permit limited movement by the other arm before any fracture will occur.

The arm 39 has a handle 55 on its upper end for convenience in manually operating the lever when starting the machine. On the shipper 46, Fig. 5, is an elongated member or arm 56, having on its inner edge, two cam faces 57, 58, meeting substantially midlength of the arm, and on the rod 47 which is rotatable to a limited extent is a pin 59. Normally this pin is in dotted line position, Fig. 5, so that it will not interfere with the sliding of the shipper 46 to throw the belts 13, 13ª, on and off the pulleys 11, 12, but the pin 59 may be caused to ride upon one or the other cam face 57 or 58, by the rotation of the rod 47 by the lever 61 and rod 62.

For stopping the machine at will, I provide the lever 61. Fig. 2, already referred to, pivoted to the casing 2, the lower lever end being connected by a link 62 with two short arms 63, 64, mounted respectively on the ends of the rods 47, 48, for turning the rod 47 in its bearings. The arm 64 turns freely on the rod 48 at the same time with and acts as a stop for arm 63, and the pin 59 will engage either the cam face 57 or 58 and act to throw the shipper 46 either one way or the other according to the position of the cam faces 57, 58, relative to the pin 59, and thus throw the belts 13 and 13ª, on the driving pulley 10 to one of the loose pulleys 11 or 12.

Attached also to the lever 61 is a link 65, Figs. 2, 4, the inner end of which is connected to a link 66, whose opposite end is connected to one end 67 of a brake band 68, the opposite end of the band carrying a lug 69 through which extends a bolt 70 carrying a nut on one end and secured at its opposite end by a forked end to the link 66. The brake band encircles one of the operating shafts, in this case the shaft 9, and obviously when the lever 61 is thrown to actuate the shipper and throw off the belt, it will simultaneously apply the brake 68 and stop the rotation of the drum or driven member almost instantly.

The operation of my novel construction is as follows: The parts in Figs. 1, 2 and 5 show the machine at rest, the stud 59, Fig. 5, having so positioned the slide 56 and shipper 46 as to throw both belts 13 and 13ª on the loose pulleys 11 and 12. With the several parts in positions shown in Figs. 1, 2 and 5, the roll 37 and timer 32, Fig. 3, would be in mid-positions respectively and not the positions shown in Fig. 3.

To start the machine, the operator grasps the lever 61, throws it to the right, Fig. 2, thus releasing the brake 68 and withdrawing the pin 59 to dotted line position, Fig. 5, and from contact with the cam faces 57, 58, so that the shipper 46 with the arm 56 can slide freely on the rods 47, 48.

The operator then grasps the handle 55 on the lever 39, Fig. 1, and turns the lever to the left for instance. This will cause the roll 37 to position the cam 35 as shown in Fig. 3, with the timer in contact with the stop 26. This movement of the lever 39 and the lever 44 and pins 45, Fig. 5, will act also to throw the shipper 46 to the right and throw belt 13 on the pulley 10.

The timer 32 being at the end of its travel when the machine is started, and not capable of further travel to the right will, through the rods 33 and 34, turn the cam slightly to the left, Fig. 2, starting the roll 37 on its travel to the right and the timer 32 on its travel to the left, Fig. 3.

When the timer reaches the limit of travel to the left, it will contact with the stop 28 and cause the rods 33, 34, to again turn the cam 35 slightly to the right, Fig. 2. The change in direction of travel of the roll will also shift the lever 39 and cause the inner end of lever 44 to shift shipper 46, throwing the belt 13 off and the belt 13ª on pulley 10 and reverse the direction of rotation of the shaft 9 and consequently of the driven member 5ª. This will, of course, continue indefinitely.

The foregoing construction places the weight of the driving and reversing mechanism largely on top of the casing where it should be instead of at the end and thereby avoids any tendency to open up the joint between the end and casing or to spring the member. It simplifies the assembly by permitting the use of elements of small dimensions and thereby also the cost facilitates shipping the machine and also distributes properly the weight of the machine. The floor space saved by mounting the driving and reversing mechanism on the top of the casing is, as already stated, an important advantage.

This invention is not restricted to the particular embodiment thereof described and illustrated herein, but is more particularly pointed out in the following claims:

1. Reversing means comprising a driven member, a casing therefor, a driving member above the casing, operating means therefor, a shipper for the operating means having opposed cam faces, a reversing shaft with reversing means including a hollow cam with a traveling timer therein above the casing and operated from the driven member connections between the reversing shaft and the driving member to reverse the direction of motion of the latter, and stop mechanism comprising a rod on which the shipper moves, a stud on the rod, and means for moving the rod to cause the stud to contact with the cam to actuate the shipper.

2. Reversing mechanism comprising a driven member, a casing therefor, a driving member thereabove, operating means therefor, a shipper for the operating means, a reversing shaft with reversing means including a hollow cam with a traveling timer therein, above and actuated from the driven member, and connections between the reversing shaft and shipper for reversing the motion of the driven member.

3. Reversing mechanism comprising a driven member, a casing therefor, a driving member above the casing, operating means therefor, a shipper for the operating means, a reversing shaft with reversing means including a hollow cam with a traveling timer therein, also above the casing and operated from the driven member and connections between the reversing shaft and driving member to reverse the direction of motion of the latter.

4. In reversing mechanism comprising a driven member, a reversing shaft thereover with reversing means including a hollow cam with a traveling timer therein driven therefrom, a driving member and connections between the reversing shaft and driving member including a shipper having opposed cam faces, stop mechanism comprising a rod in engagement with the shipper and having a stud thereon, a stop lever connected to the rod to throw the stud against the cam to actuate the shipper to stop the driving member.

5. In reversing mechanism comprising a driven member a driving member, a reversing shaft with reversing means including a hollow cam with a traveling timer therein driven therefrom, and connected thereto by a shaft intermediate the driving and driven member and connections between the said shaft and driving members including a shipper having opposed cam faces; stop mechanism comprising a rod in engagement with the shipper and having a stud thereon, a stop lever connected to the rod to throw the stud against the cam to actuate the shipper and a brake mechanically connected to said stop lever for simultaneously applying the brake while moving the shipper.

6. Reversing mechanism comprising a driven member, a casing therefor, a driving member above the casing, operating means therefor, a shipper for the operating means, a reversing shaft also above the casing and operated from the driven member and a flexible driving connection between the reversing shaft and driving member to reverse the direction of motion of the latter.

7. Stop mechanism for driving and reversing means comprising a rotatable rod with a stud thereon, a belt shipper movable longitudinally only on the rod and having opposed cam faces operatively positioned relatively to the stud, a brake for the driving shaft including a brake rod, and means connected both to the brake rod and the rotatable rod to apply the brake and simultaneously rotate the said rotatable rod and stud to bring the latter in contact with one of the cam faces to actuate the belt shipper to stop the driving means.

8. In driving mechanism, reversing means comprising a reversing shaft located between and operatively connected to the driving and driven means, an adjustable timer and a traveling timer both on the reversing shaft, a hollow cam roll also on the reversing shaft all between the upright planes at the ends of the driven member and operatively connected to the traveling timer, whereby the latter on arriving at its end of travel changes the position of the cam and, through flexible connections, the position of the driving member operating means to reverse the direction of motion of the latter.

9. In driving mechanism, reversing means comprising an intermediate gear between the driving and driven members, a reversing shaft driven thereby, a hollow cam and traveling timer therein on the reversing shaft, a roll therefor in engagement with the cam, and yielding connections between the roll and driving means to reverse the direction of rotation of the latter.

10. Reversing mechanism comprising, in combination with a driven member, a reversing shaft with reversing members thereon above the driven member, driving means therefor including a sliding arm with longitudinally opposed cam faces thereon, a rotatable rod with a stud and means to rotate the rod and stud in the plane of its length, and across the path of the sliding arm and cam faces, the driven member operatively connected to the driving means and connections including downwardly extended arms and yielding spacing members therefor providing a flexible connection between the driving means and the reversing shaft for controlling the action of the latter.

11. The driven member support 1 with a driven member $5^a$ thereon, in combination with the driving shaft 9 operatively connected to the driven member and above and at the rear of the same, and reversing mechanism therefor comprising the shaft 19 with the cam 35 having the cam groove 36 thereon and roll 37 travelling therein together with a nut 32 and arms 33, 34 all on the shaft 19; a stud 38 operatively positioned adjacent the roll 37 and against which the roll 37 rotates; the operating belt shifting means for the shaft 9 comprising the shipper rods 47, 48 on the support 1, the shipper 46 slidably carried by said rods and having the belt guide hoop 49 with eyes 52 thereon, the belts 13, $13^a$ controlled by said eyes as to position, the shipper member 56 having on its edge the cam faces 57, 58; the normally laterally extended pin 59 on the rod 47 cooperatively positioned with the cams 57, 58 and constructed and arranged to be moved by the turning of the rod 47 to bring the pin upwardly in contact therewith; and the lever 61 and connections with the rod 47 for turning said rod and the pin 59 to cause it, in connection with the cam 57 or 58, to throw the shipper 46 to stop the driving mechanism.

In testimony whereof, I have signed my name to this specification.

FRITZ W. A. HENRICI.